(12) United States Patent
Gotrik et al.

(10) Patent No.: US 11,117,358 B2
(45) Date of Patent: Sep. 14, 2021

(54) TRANSFER ARTICLES

(71) Applicant: 3M INNOVATIVE PROPERTIES COMPANY, St. Paul, MN (US)

(72) Inventors: Kevin W. Gotrik, Hudson, WI (US); Christopher S. Lyons, St. Paul, MN (US); Christopher A. Merton, St. Louis Park, MN (US); Scott J. Jones, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 12 days.

(21) Appl. No.: 16/493,673

(22) PCT Filed: Mar. 19, 2018

(86) PCT No.: PCT/IB2018/051832
§ 371 (c)(1),
(2) Date: Sep. 12, 2019

(87) PCT Pub. No.: WO2018/178802
PCT Pub. Date: Oct. 4, 2018

(65) Prior Publication Data
US 2020/0016879 A1 Jan. 16, 2020

Related U.S. Application Data

(60) Provisional application No. 62/478,992, filed on Mar. 30, 2017.

(51) Int. Cl.
| | | |
|---|---|---|
| *B32B 37/02* | (2006.01) | |
| *H01L 51/52* | (2006.01) | |
| *B32B 7/06* | (2019.01) | |
| *B32B 37/00* | (2006.01) | |

(52) U.S. Cl.
CPC ........... *B32B 37/025* (2013.01); *B32B 7/06* (2013.01); *H01L 51/5253* (2013.01)

(58) Field of Classification Search
CPC ...... B32B 37/025; B32B 7/06; H01L 51/5253
USPC .................................................. 428/40.1
See application file for complete search history.

(56) References Cited

U.S. PATENT DOCUMENTS

| | | |
|---|---|---|
| 5,032,461 A | 7/1991 | Shaw |
| 5,440,446 A | 8/1995 | Shaw |
| 5,877,895 A | 3/1999 | Shaw |
| 6,045,864 A | 4/2000 | Lyons |

(Continued)

FOREIGN PATENT DOCUMENTS

| | | | |
|---|---|---|---|
| JP | 2014-205247 | | 10/2014 |
| JP | 2014205247 A | * | 10/2014 |

(Continued)

OTHER PUBLICATIONS

Translation of JP2014205247 (Year: 2014).*

(Continued)

*Primary Examiner* — Michael M. Bernshteyn

(57) ABSTRACT

A transfer article (100) is provided. The transfer article (100) includes a release layer (110), wherein the release layer (110) comprises a metal layer or a doped semiconductor layer; a first acrylate layer (120) overlaying the release layer (110); and a function layer (130) overlaying the first acrylate layer (120); wherein a release value between the release layer (110) and the first acrylate layer (120) is from 2 to 50 g/inch.

13 Claims, 1 Drawing Sheet

(56) References Cited

U.S. PATENT DOCUMENTS

| | | | |
|---|---|---|---|
| 6,231,939 B1* | 5/2001 | Shaw | B65D 1/0215 |
| | | | 428/35.9 |
| 6,869,666 B2 | 3/2005 | Deeb | |
| 7,018,713 B2 | 3/2006 | Padiyath | |
| 7,486,019 B2 | 2/2009 | Padiyath | |
| 7,940,004 B2 | 5/2011 | Padiyath | |
| 8,658,248 B2 | 2/2014 | Anderson | |
| 8,979,536 B2 | 3/2015 | Jones | |
| 2004/0000047 A1* | 1/2004 | Wilheim | B29C 63/0043 |
| | | | 29/428 |
| 2009/0155584 A1* | 6/2009 | Rolland | B32B 15/20 |
| | | | 428/336 |
| 2010/0316852 A1 | 12/2010 | Condo | |
| 2015/0151531 A1 | 6/2015 | Ohno | |
| 2015/0344361 A1 | 12/2015 | Tanaka | |
| 2016/0016338 A1 | 1/2016 | Radcliffe | |

FOREIGN PATENT DOCUMENTS

| | | |
|---|---|---|
| WO | WO 2014-028677 | 2/2014 |
| WO | WO 2017-003870 | 1/2017 |
| WO | WO 2017-106078 | 6/2017 |
| WO | WO 2017-106107 | 6/2017 |
| WO | WO 2018-178803 | 10/2018 |

OTHER PUBLICATIONS

Skotheim, Handbook of Conducting Polymers, 5 Pages (1998).
International Search Report for PCT International Application No. PCT/IB2018/051832, dated Jun. 26, 2018, 5pgs.

* cited by examiner

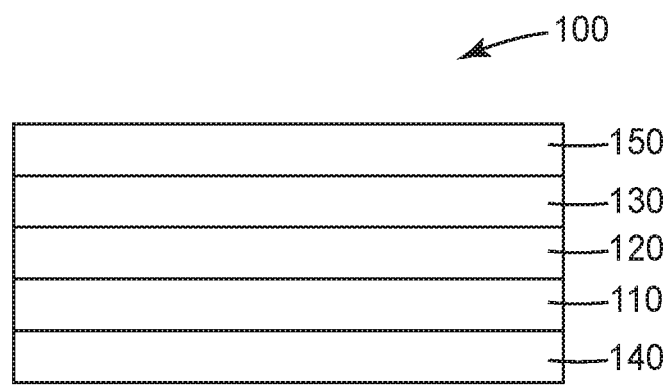

TRANSFER ARTICLES

FIELD

The present disclosure relates to transfer articles. The present disclosure further provides methods of using these transfer articles.

BACKGROUND

Many electronic devices are sensitive to environmental gases and liquids and are prone to degradation on permeation of the environmental gases and liquids such as oxygen and water vapor. Inorganic or hybrid inorganic/organic layers have been used in thin films for electrical, packaging and decorative applications to prevent the degradation. For example, multilayer stacks of inorganic or hybrid inorganic/organic layers can be used to make barrier films resistant to moisture permeation. In some circumstances, these inorganic or hybrid inorganic/organic layers may need to be transferred without release layers. While the technology of the prior art may be useful, there exists a need for better transfer articles useful for preventing inorganic or hybrid inorganic/organic layers from damage when they are transferred.

SUMMARY

Thus, in one aspect, the present disclosure provides a transfer article comprising: a release layer, wherein the release layer comprises a metal layer or a doped semiconductor layer; a first acrylate layer overlaying the release layer; and a function layer overlaying the first acrylate layer; wherein a release value between the release layer and the first acrylate layer is from 2 to 50 g/inch.

In another aspect, the present disclosure provides a method comprising: applying the transfer article of the current application to a surface of interest, with the function layer being between the release layer and the surface of interest; and removing the release layer from the transfer article with the first acrylate layer and the function layer left on the surface of interest.

Various aspects and advantages of exemplary embodiments of the present disclosure have been summarized. The above Summary is not intended to describe each illustrated embodiment or every implementation of the present disclosure. Further features and advantages are disclosed in the embodiments that follow. The Drawings and the Detailed Description that follow more particularly exemplify certain embodiments using the principles disclosed herein.

DEFINITIONS

For the following defined terms, these definitions shall be applied for the entire Specification, including the claims, unless a different definition is provided in the claims or elsewhere in the Specification based upon a specific reference to a modification of a term used in the following definitions:

The terms "about" or "approximately" with reference to a numerical value or a shape means +/− five percent of the numerical value or property or characteristic, but also expressly includes any narrow range within the +/− five percent of the numerical value or property or characteristic as well as the exact numerical value. For example, a temperature of "about" 100° C. refers to a temperature from 95° C. to 105° C., but also expressly includes any narrower range of temperature or even a single temperature within that range, including, for example, a temperature of exactly 100° C. For example, a viscosity of "about" 1 Pa-sec refers to a viscosity from 0.95 to 1.05 Pa-sec, but also expressly includes a viscosity of exactly 1 Pa-sec. Similarly, a perimeter that is "substantially square" is intended to describe a geometric shape having four lateral edges in which each lateral edge has a length which is from 95% to 105% of the length of any other lateral edge, but which also includes a geometric shape in which each lateral edge has exactly the same length.

The term "substantially" with reference to a property or characteristic means that the property or characteristic is exhibited to a greater extent than the opposite of that property or characteristic is exhibited. For example, a substrate that is "substantially" transparent refers to a substrate that transmits more radiation (e.g. visible light) than it fails to transmit (e.g. absorbs and reflects). Thus, a substrate that transmits more than 50% of the visible light incident upon its surface is substantially transparent, but a substrate that transmits 50% or less of the visible light incident upon its surface is not substantially transparent.

The term "release value" with reference to average peel force determined by the test for T-Peel Test Method or 180° Peel Test Method in Examples.

The terms "a", "an", and "the" include plural referents unless the content clearly dictates otherwise. Thus, for example, reference to a material containing "a compound" includes a mixture of two or more compounds.

BRIEF DESCRIPTION OF THE DRAWINGS

The disclosure may be more completely understood in consideration of the following detailed description of various embodiments of the disclosure in connection with the accompanying figures, in which:

FIG. 1 is a side view of an exemplary transfer article according to the present invention.

While the above-identified drawings, which may not be drawn to scale, set forth various embodiments of the present disclosure, other embodiments are also contemplated, as noted in the Detailed Description. In all cases, this disclosure describes the presently disclosed invention by way of representation of exemplary embodiments and not by express limitations. It should be understood that numerous other modifications and embodiments can be devised by those skilled in the art, which fall within the scope and spirit of this disclosure.

DETAILED DESCRIPTION

Before any embodiments of the present disclosure are explained in detail, it is understood that the invention is not limited in its application to the details of use, construction, and the arrangement of components set forth in the following description. The invention is capable of other embodiments and of being practiced or of being carried out in various ways that will become apparent to a person of ordinary skill in the art upon reading the present disclosure. Also, it is understood that the phraseology and terminology used herein is for the purpose of description and should not be regarded as limiting. The use of "including," "comprising," or "having" and variations thereof herein is meant to encompass the items listed thereafter and equivalents thereof as well as additional items. It is understood that other embodiments may be utilized and structural or logical changes may be made without departing from the scope of the present disclosure.

As used in this Specification, the recitation of numerical ranges by endpoints includes all numbers subsumed within that range (e.g. 1 to 5 includes 1, 1.5, 2, 2.75, 3, 3.8, 4, and 5, and the like).

Unless otherwise indicated, all numbers expressing quantities or ingredients, measurement of properties and so forth used in the Specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

A release layer is often used to release a function layer and enable the transferring of the function layer to another substrate or surface of an article or device. This release force should occur with a low enough release force such that the function layer is not significantly altered during transfer. Additionally, the release force of the function layer should not significantly alter the article or device being transferred to. Many release liner materials, for example, silicones and fluoropolymers, have very low surface energy and can be difficult to coat an acrylate uniformly on to a release layer without dewetting problems. An additional frequent problem with release layers is the potential contamination from the release layer to the final functional layer. A well-known example is transfer of silicone material from a silicone release liner to the surface of the transferred function layer. The present disclosure provides a transfer article with reduced potential of contamination to the transferred functional layer and improved coatability on to the release surface. For example, the transfer article of the present disclosure can be useful in Organic Light Emitting Diodes OLED) devices. If the adhesion of between the release layer and OLED device is too high, it will cause damages on OLED device when the transfer article is transferred.

The present disclosure provides transfer articles and methods of using these transfer articles. Referring now to FIG. 1, an exemplary transfer article 100 according to the present disclosure is illustrated. Transfer article 100 includes a release layer 110, a first acrylate layer 120 overlaying the release layer 110, and a function layer 130 overlaying the first acrylate layer 120. The release layer 110 can include a metal layer or a doped semiconductor layer. In the embodiment shown in FIG. 1, the first acrylate layer 120 is in direct contact with the release layer 110 and the function layer 130. In other embodiments, there can be additional layers between the first acrylate layer 120 and the function layer 130. Transfer article 100 may also include a substrate 140 underlaying the release layer 110. In the embodiment shown in FIG. 1, the substrate 140 is in direct contact with the release layer 110. In other embodiments, there can be additional layers between the substrate 140 and the release layer 110. In some embodiments, the transfer article 100 may further include an adhesive layer. In some embodiments, the transfer article 100 may further include a second acrylate layer 150 overlaying the function layer 130. In these embodiments, the function layer 130 may be between the first acrylate layer 120 and the second acrylate layer 150.

In some embodiments, a release value between the release layer 110 and the first acrylate layer 120 is less than 50 g/inch, 40 g/inch, 30 g/inch, 20 g/inch, 15 g/inch, 10 g/inch, 9 g/inch, 8 g/inch, 7 g/inch, 6 g/inch, 5 g/inch, 4 g/inch or 3 g/inch. In some embodiments, a release value between the release layer 110 and the first acrylate layer 120 is more than 1 g/inch, 2 g/inch, 3 g/inch or 4 g/inch. In some embodiments, a release value between the release layer 110 and the first acrylate layer 120 is from 1 to 50 g/inch, from 1 to 40 g/inch, from 1 to 30 g/inch, from 1 to 20 g/inch, from 1 to 15 g/inch, from 1 to 10 g/inch, from 1 to 8 g/inch from 2 to 50 g/inch, from 2 to 40 g/inch, from 2 to 30 g/inch, from 2 to 20 g/inch, from 2 to 15 g/inch, from 2 to 10 g/inch, or from 2 to 8 g/inch.

The transfer article 100 of the current application can be used to transfer the first acrylate layer 120 and the function layer 130, without the need of a release layer, so that the function layer 130, the release layer 110 and/or the substrate 140 can be reused. The transfer article 100 can be applied to a surface of interest, for example, an OLED device, with the function layer 130 being between the first acrylate layer 120 and the surface of interest. After the transfer article 100 is applied to the surface of interest, the release layer 110 and the substrate 140, if present, can be removed from the transfer article 100. The first acrylate layer 120 and the function layer 130 are left on the surface of interest. In some embodiments, the optional adhesive layer can help the function layer 130 to attach to the surface of interest.

Release Layer

The release layer 110 can include a metal layer. The metal layer may include at least one selected from the group consisting of individual metals, two or more metals as mixtures, inter-metallics or alloys, semi-metals or metalloids, metal oxides, metal and mixed metal oxides, metal and mixed metal fluorides, metal and mixed metal nitrides, metal and mixed metal carbides, metal and mixed metal carbonitrides, metal and mixed metal oxynitrides, metal and mixed metal borides, metal and mixed metal oxy borides, metal and mixed metal silicides, diamond-like carbon, diamond-like glass, graphene, and combinations thereof. In some embodiments, the metal layer may conveniently be formed of Al, Zr, Cu, NiCr, Ti, or Nb with thicknesses between 1-3000 nm.

The release layer 110 can include a doped semiconductor layer. In some embodiments, the doped semiconductor layer may conveniently be formed of Si, B-doped Si, Al-doped Si, P-doped Si with thicknesses between 1-3000 nm. A particularly suitable doped semiconductor layer is Al-doped Si, wherein the Al compositional percentage is 10%.

The release layer can typically be prepared by evaporation, reactive evaporation, sputtering, reactive sputtering, chemical vapor deposition, plasma enhanced chemical vapor deposition, and atomic layer deposition. Preferred methods include vacuum preparations such as sputtering and evaporation.

Substrates

The substrate 140 can be heat-shrinkable. The heat-shrinkable substrate can shrink at a predetermined temperature. Suitable substrate 140 can be conveniently an organic polymeric layer that is processed to be heat-shrinkable by any suitable means. Semicrystalline or amorphous polymers can be made heat-shrinkable by orienting them at a temperature above their glass transition temperature, Tg, and then cooling. Examples of useful semicrystalline polymeric films include polyolefins such as polyethylene (PE), polypropylene (PP), and syndiotactic polystyrene (sPS); polyesters such as polyethylene terephthalate (PET), polyethylene napthalate (PEN), and polyethylene-2,6-naphthalate; fluorpolymers such as polyvinylidene difluoride, and ethylene: tetrafluoroethylene copolymers (ETFE); polyamides such as Nylon 6 and Nylon 66; polyphenylene oxide, and polyphenylene sulfide. Examples of amorphous polymer films include polymethylmethacrylate (PMMA), polyimides (PI), polycarbonate (PC), polyether sulfone (PES), atactic polystyrene (aPS), polyvinyl chloride (PVC), and norbornene based cyclic olefin polymer (COP) and cyclic olefin copolymer (COC). Some polymer materials are available in both semicrystalline and amorphous forms. Semicrystalline polymers such as those listed above can also be made heat-shrinkable by heating to the peak crystallization temperature and cooling.

Biaxially or uniaxially oriented polyethylene terephthalate (PET) with a thickness of approximately 0.002 inch (0.05 mm) is considered a convenient choice, as is biaxially oriented polypropylene (BOPP) film. Biaxially oriented polypropylene (BOPP) is commercially available from several suppliers including ExxonMobil Chemical Company of Houston, Tex.; Continental Polymers of Swindon, UK; Kaisers International Corporation of Taipei City, Taiwan and PT Indopoly Swakarsa Industry (ISI) of Jakarta, Indonesia.

Acrylate Layer

The first and second acrylate layers may be made from the same material or different materials. In some embodiments, the first acrylate layer or the second acrylate layer can include an acrylate or an acrylamide. When the acrylate layers are to be formed by flash evaporation of the monomer, vapor deposition, followed by crosslinking, volatilizable acrylate and methacrylate (referred to herein as "(meth) acrylate") or acrylamide or methacrylamide (referred to herein as "(meth)acrylamide") monomers are useful, with volatilizable acrylate monomers being preferred. A suitable (meth)acrylate or (meth) acrylamide monomer has sufficient vapor pressure to be evaporated in an evaporator and condensed into a liquid or solid coating in a vapor coater.

Examples of suitable monomers include, but are not limited to, hexanediol diacrylate; ethoxyethyl acrylate; cyanoethyl (mono)acrylate; isobornyl (meth)acrylate; octadecyl acrylate; isodecyl acrylate; lauryl acrylate; beta-carboxyethyl acrylate; tetrahydrofurfuryl acrylate; dinitrile acrylate; pentafluorophenyl acrylate; nitrophenyl acrylate; 2-phenoxyethyl (meth)acrylate; 2,2,2-trifluoromethyl (meth)acrylate; diethylene glycol diacrylate; triethylene glycol di(meth)acrylate; tripropylene glycol diacrylate; tetraethylene glycol diacrylate; neo-pentyl glycol diacrylate; propoxylated neopentyl glycol diacrylate; polyethylene glycol diacrylate; tetraethylene glycol diacrylate; bisphenol A epoxy diacrylate; 1,6-hexanediol dimethacrylate; trimethylol propane triacrylate; ethoxylated trimethylol propane triacrylate; propylated trimethylol propane triacrylate; tris(2-hydroxyethyl)-isocyanurate triacrylate; pentaerythritol triacrylate; phenylthioethyl acrylate; naphthloxyethyl acrylate; neopentyl glycol diacrylate, MIRAMER M210 (available from Miwon Specialty Chemical Co., Ltd., Korea), KAYARAD R-604 (available from Nippon Kayaku Co., Ltd., Tokyo, Japan), epoxy acrylate under the product number RDX80094 (available from RadCure Corp., Fairfield, N.J.); and mixtures thereof. A variety of other curable materials can be included in the polymer layer, such as, e.g., vinyl ethers, vinyl mapthalene, acrylonitrile, and mixtures thereof.

In particular, tricyclodecane dimethanol diacrylate is considered suitable. It is conveniently applied by, e.g., condensed organic coating followed by UV, electron beam, or plasma initiated free radical polymerization. A thickness between about 10 and 10000 nm is considered convenient, with approximately between about 10 and 5000 nm in thickness being considered particularly suitable. In some embodiments, thickness of organic layer can be between about 10 and 3000 nm.

Function Layer

In some embodiments, the function layer 130 can include a barrier layer, an optical layer, or an electrically conductive layer. In some embodiments, the function layer 130 can have a thickness of less than 10 μm, less than 5 μm, less than 4 μm, less than 3 μm or less than 2 μm.

The barrier layer may include at least one selected from the group consisting of individual metals, two or more metals as mixtures, inter-metallics or alloys, semi-metal or metalloids, metal oxides, metal and mixed metal oxides, metal and mixed metal fluorides, metal and mixed metal nitrides, metal and mixed metal carbides, metal and mixed metal carbonitrides, metal and mixed metal oxynitrides, metal and mixed metal borides, metal and mixed metal oxy borides, metal and mixed metal silicides, diamond-like carbon, diamond-like glass, graphene, and combinations thereof.

In some embodiments, the barrier layer may conveniently be formed of metal oxides, metal nitrides, metal oxynitrides, and metal alloys of oxides, nitrides and oxynitrides. In one aspect the barrier layer may include a metal oxide. In some embodiments, the barrier layer may include at least one selected from the group consisting of silicon oxides such as silica, aluminum oxides such as alumina, titanium oxides such as titania, indium oxides, tin oxides, indium tin oxide (ITO), hafnium oxide, tantalum oxide, zirconium oxide, zinc oxide, niobium oxide, and combinations thereof. Preferred metal oxides may include aluminum oxide, silicon oxide, silicon aluminum oxide, aluminum-silicon-nitride, and aluminum-silicon-oxy-nitride, CuO, $TiO_2$, ITO, ZnO, aluminum zinc oxide, $ZrO_2$, and yttria-stabilized zirconia. Preferred nitrides may include $Si_3N_4$ and TiN. The barrier layer can typically be prepared by reactive evaporation, reactive sputtering, chemical vapor deposition, plasma enhanced chemical vapor deposition, and atomic layer deposition. Preferred methods include vacuum preparations such as reactive sputtering and plasma enhanced chemical vapor deposition, and atomic layer deposition.

The barrier layer can be conveniently applied as a thin layer. The barrier layer material, e.g. silicon aluminum oxide, can for example, provide good barrier properties, as well as good interfacial adhesion to acrylate layers. Such layers are conveniently applied by sputtering, and a thickness between about 5 and 100 nm is considered convenient, with approximately 27 nm in thickness being considered particularly suitable. In some embodiments, the barrier layer may have a water vapor transmission rate of less than 0.2, 0.1, 0.05, 0.01, 0.005 or 0.001 $g/m^2$/day, thus providing good barrier properties.

The optical layer may include reflective, anti-reflective, partially absorbing, polarizing, retarding, diffractive, scattering, or transmissive properties over electromagnetic wavelengths of interest. Examples of optical layers may include diffusing or diffracting layers, where micro or nano-scale features with varying optical properties can scatter visible light. The optical layer may include a metal layer, e.g. Al, which is a broad-band reflector over the optical electromagnetic spectrum. The optical layer may include a high-low index pair materials, e.g. niobium pentoxide and silicon dioxide and can provide good reflectivity over optical wavelengths of interest by tuning their respective thicknesses. Other examples of optical layers include cavity enhanced absorbers which can create aesthetically pleasing colors over the visible spectrum of light as disclosed in U.S. Pat. No.

5,877,895 A (Shaw et al.). This optical layer can be created with two reflective or semi-transparent metal mirrors separated from each other by typically 50-750 nm.

The optical layer can be conveniently applied as a thin layer. Such layers are conveniently applied by sputtering, evaporation, or flash evaporation, and a thickness between 5 and 500 nm is considered convenient.

The electrically-conductive layer can include a conductive elemental metal, a conductive metal alloy, a conductive metal oxide, a conductive metal nitride, a conductive metal carbide, a conductive metal boride, a conductive polymer, graphene, and combinations thereof. Preferred conductive metals include elemental silver, copper, aluminum, gold, palladium, platinum, nickel, rhodium, ruthenium, aluminum, and zinc. Alloys of these metals, such as silver-gold, silver-palladium, silver-gold-palladium, or dispersions containing these metals in admixture with one another or with other metals also can be used. Transparent conductive oxides (TCO), such as indium-tin-oxide (ITO), indium-zinc-oxide (IZO), zinc oxide, with or without, dopants, such as aluminum, gallium and boron, other TCOs, and combinations thereof can also be used as an electrically-conductive layer. Preferably, the physical thickness of an electrically-conductive metallic layer is in a range from about 3 nm to about 50 nm (in some embodiments, about 5 nm to about 20 nm), whereas the physical thickness of the transparent conductive oxide layers are preferably in a range from about 10 nm to about 500 nm (in some embodiments, about 20 nm to about 300 nm). The resulting electrically-conductive layer can typically provide a sheet resistance of less than 300 ohms/sq. (in some embodiments, less than 200 ohms/sq., or even less than 100 ohms/sq.). For function layers applied to a structured surface, the layer may follow the surface contour of the structured surface so that the electrical conductivity function is created at the interface between the structured surface and the deposited layer, and at the second surface of the functional coating layer contacting air or the surface of another substrate.

The electrically-conductive layer can be conveniently applied by sputtering, reactive sputtering, evaporation, reactive evaporation, and with a thickness between 5 and 500 nm. The electrically-conductive layer can be made, for example, from transparent conductive polymers. Conductive polymers include derivatives of polyacetylene, polyaniline, polypyrrole, PETOT/PSS (poly(3,4-ethylenedioxythiophene)/polystyrenesulfonic acid), or polythiophenes (see, e.g., Skotheim et al., Handbook of Conducting Polymers, 1998). Although not wanting to be bound by theory, it is believed that these polymers have conjugated double bonds which allow for conduction. Further, although not wanting to be bound by theory, it is believed that by manipulating the band structure, polythiophenes have been modified to achieve a HUMO-LUMO separation that is transparent to visible light. In a polymer, the band structure is determined by the molecular orbitals. The effective bandgap is the separation between the highest occupied molecular orbital (HOMO) and lowest unoccupied molecular orbital (LUMO).

The electrically-conductive layer can comprise, for example, anisotropic nano-scale materials which can be solid or hollow. Solid anisotropic nano-scale materials include nanofibers and nanoplatelets. Hollow anisotropic nano-scale materials include nanotubes. Typically, the nanotube has an aspect ratio (length:diameter) greater than 10:1 (in some embodiments, greater than 50:1, or even greater than 100:1). The nanotubes are typically greater than 500 nm (in some embodiments, greater than 1 micrometer, or even greater than 10 micrometers) in length. These anisotropic nano-scale materials can be made from any conductive material. Most typically, the conductive material is metallic. The metallic material can be an elemental metal (e.g., transition metals) or a metal compound (e.g., metal oxide). The metallic material can also be a metal alloy or a bimetallic material, which comprises two or more types of metal. Suitable metals include silver, gold, copper, nickel, gold-plated silver, platinum, and palladium. The conductive material can also be non-metallic (e.g., carbon or graphite (an allotrope of carbon)).

Adhesive Layer

Adhesive layer can include a viscoelastic or elastomeric adhesive. Viscoelastic or elastomeric adhesives can include those described in U.S. Pat. App. Pub. No. 2016/0016338 (Radcliffe et al.), for example, pressure-sensitive adhesives (PSAs), rubber-based adhesives (e.g., rubber, urethane) and silicone-based adhesives. Viscoelastic or elastomeric adhesives also include heat-activated adhesives which are non-tacky at room temperature but become temporarily tacky and are capable of bonding to a substrate at elevated temperatures. Heat activated adhesives are activated at an activation temperature and above this temperature have similar viscoelastic characteristics as PSAs. Viscoelastic or elastomeric adhesives may be substantially transparent and optically clear. Any of the viscoelastic or elastomeric adhesives of the present description may be viscoelastic optically clear adhesives. Elastomeric materials may have an elongation at break of greater than about 20 percent, or greater than about 50 percent, or greater than about 100 percent. Viscoelastic or elastomeric adhesive layers may be applied directly as a substantially 100 percent solids adhesive or may be formed by coating a solvent-borne adhesive and evaporating the solvent. Viscoelastic or elastomeric adhesives may be hot melt adhesives which may be melted, applied in the melted form and then cooled to form a viscoelastic or elastomeric adhesive layer. Suitable viscoelastic or elastomeric adhesives include elastomeric polyurethane or silicone adhesives and the viscoelastic optically clear adhesives CEF22, 817x, and 818x, all available from 3M Company, St. Paul, Minn. Other useful viscoelastic or elastomeric adhesives include PSAs based on styrene block copolymers, (meth)acrylic block copolymers, polyvinyl ethers, polyolefins, and poly(meth)acrylates. The adhesive layer can include a UV cured adhesive.

The following embodiments are intended to be illustrative of the present disclosure and not limiting.

EMBODIMENTS

Embodiment 1 is a transfer article comprising:
  a release layer, wherein the release layer comprises a metal layer or a doped semiconductor layer;
  a first acrylate layer overlaying the release layer; and
  a function layer overlaying the first acrylate layer;
  wherein a release value between the release layer and the first acrylate layer is from 2 to 50 g/inch.

Embodiment 2 is the transfer article of embodiment 1, wherein the release value between the release layer and the first acrylate layer is from 2 to 40 g/inch.

Embodiment 3 is the transfer article of any one of embodiments 1 to 2, wherein the release value between the release layer and the first acrylate layer is from 2 to 30 g/inch.

Embodiment 4 is the transfer article of any one of embodiments 1 to 3, wherein the release value between the release layer and the first acrylate layer is from 2 to 15 g/inch.

Embodiment 5 is the transfer article of any one of embodiments 1 to 4, further comprising a substrate underlaying the release layer.

Embodiment 6 is the transfer article of any one of embodiments 1 to 5, further comprising an adhesive layer.

Embodiment 7 is the transfer article of any one of embodiments 1 to 6, wherein a thickness of the function layer is less than 5 μm.

Embodiment 8 is the transfer article of any one of embodiments 1 to 7, wherein the function layer comprises a barrier layer.

Embodiment 9 is the transfer article of embodiment 8, wherein the barrier layer has a water vapor transmission rate of less than 0.1 g/m$^2$/day.

Embodiment 10 is the transfer article of any one of embodiments 8 to 9, wherein the barrier layer has a water vapor transmission rate of less than 0.005 g/m$^2$/day.

Embodiment 11 is the transfer article of any one of embodiments 8 to 10, wherein the barrier layer comprises at least one selected from the group consisting of individual metals, two or more metals as mixtures, inter-metallics or alloys, semi-metal or metalloids, metal oxides, metal and mixed metal oxides, metal and mixed metal fluorides, metal and mixed metal nitrides, metal and mixed metal carbides, metal and mixed metal carbonitrides, metal and mixed metal oxynitrides, metal and mixed metal borides, metal and mixed metal oxy borides, metal and mixed metal silicides, diamond-like carbon, diamond-like glass, graphene, and combinations thereof.

Embodiment 12 is the transfer article of any one of embodiments 1 to 7, wherein the function layer comprises an optical layer.

Embodiment 13 is the transfer article of any one of embodiments 1 to 7, wherein the function layer comprises an electrically conductive layer.

Embodiment 14 is the transfer article of any one of embodiments 1 to 13, further comprising a second acrylate layer.

Embodiment 15 is a method comprising:
applying the transfer article of any one of embodiments 1 to 14 to a surface of interest, with the function layer being between the release layer and the surface of interest; and
removing the release layer from the transfer article with the first acrylate layer and the function layer left on the surface of interest.

EXAMPLES

The following examples are intended to illustrate exemplary embodiments within the scope of this disclosure. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. All percentages are by weight, unless otherwise noted. Reagents are from the Sigma-Aldrich Corporation (St. Louis, Mo.) unless otherwise noted. At the very least, and not as an attempt to limit the application of the doctrine of equivalents to the scope of the claims, each numerical parameter should at least be construed in light of the number of reported significant digits and by applying ordinary rounding techniques.

Test Methods:
T-Peel Test Method

Peel force was measured using a T-Peel test according to ASTM D1876-08 "Standard Test Method for Peel Resistance of Adhesives (T-Peel Test)". Samples measuring 2 inches by 6 inches were cut from sheets of coated film and laid coated side up on a smooth clean surface. A piece of Scotch® 3850 Shipping Packaging Tape was cut measuring about 8 inches long, aligned with the long edge of the sample, and applied to the coated side of the sample with a hard rubber hand roller using firm pressure. Care was taken to avoid the formation of creases or any entrapped air. A 1 inch wide test strip was slit out of the center of the laminated sample, in the long dimension, ensuring the two edge cuts were clean and parallel. The first one-quarter to one-half inch of the laminated test strip was separated and the two separated ends were secured in the grips of a tensile tester which was configured to conduct testing in a T-Peel geometry at a peel rate of 3 inches/minute and record the peel force in grams. Within five minutes after the application of the tape to the sample, the peel was initiated and allowed to continue until at least 4 inches of the test strip length had been separated. The separated surfaces of the test strip were examined to determine location of failure and the peel value was recorded in grams per linear inch. The instantaneous peel force was measured every 0.008 s and the average was taken over the duration of the peel length. The tests were done at about 74° F. and 72% relative humidity. A 2 kg load cell was used with a 4 second delay and a 0.13 cm/s peel rate. The peak peel force was the maximum instantaneous peel force experienced along the length of the strip.

180° Peel Test Method

Test specimens were prepared as described in T-Peel for Peel Force, except that the test strips were 2 inches wide. The test was conducted in a 180° peel geometry. The peel values reported were average instantaneous peel forces over the length of the strip. The peak value reported was the maximum instantaneous peel force experienced along the length. A peel rate of 4 cm/s was used.

Water Vapor Transmission Rate

The water vapor transmission rate (WVTR) of test specimens was measured using commercially available water vapor transmission testing equipment (PERMATRAN W700 from Mocon, Inc. (Minneapolis, Minn.)) in accordance with ASTM F-1249. The testing regime was 50° C. and 100% relative humidity (RH).

Example 1

Barrier Coating on Cu for Release

A function layer of a barrier film of Example 1 and the following Examples of barrier films were made on a roll to roll vacuum coater similar to the coater described in U.S. Patent Application No. 20100316852 (Condo, et al.) with the addition of a second evaporator and curing system located between the plasma pretreatment station and the first sputtering system, and using evaporators as described in U.S. Pat. No. 8,658,248 (Anderson and Ramos). This coater was outfitted with a substrate in the form of a 1000 ft length roll of 0.05 mm thick, 14 inch (35.6 cm) wide polyethylene terephthalate (PET) film manufactured by 3M Company. The substrate was prepared for coating by subjecting it to a nitrogen plasma treatment to improve the adhesion of the metallic layer. The film was treated with a nitrogen plasma operating at 120 W using a titanium cathode, using a web speed of 8.0 meters/min and maintaining the backside of the film in contact with a coating drum chilled to 0° C.

On this prepared PET substrate, the release layer of copper was deposited in-line with the previous plasma treatment step. The copper deposition used a conventional direct current (DC) sputtering process operated at 2 kW of power to deposit a 7 nm thick layer onto the substrate at a line speed of 26 fpm (8.0 m/min). The Cu coated PET substrate was then rewound.

In a second pass at a line speed of 16 fpm (4.9 m/min), an acrylate layer (tricyclodecane dimethanol diacrylate, commercially available as SARTOMER SR833S from Sartomer USA (Exton, Pa.)) was formed on top of the Cu layer. The acrylate layer was applied by ultrasonic atomization and flash evaporation to make a coating width of 12.5 inches (31.8 cm). The flow rate of this mixture into the atomizer was 0.67 ml/min to achieve a 375 nm layer, the gas flow rate was 60 standard cubic centimeters per minute (sccm), and the evaporator temperature was 260° C. Once condensed onto the Cu layer, this monomeric coating was cured immediately with an electron beam curing gun operating at 7.0 kV and 4.0 mA.

On this cured organic layer, an inorganic oxide barrier function layer of silicon aluminum oxide was applied in the same pass through the vacuum coater. This silicon aluminum oxide layer was laid down using an alternating current (AC) reactive sputter deposition process employing a 40 kHz AC power supply. The cathode had a Si(90%)/Al(10%) rotary target, obtained from Soleras Advanced Coatings US (Biddeford, Me.). The voltage for the cathode during sputtering was controlled by a feed-back control loop that monitored the voltage and controlled the oxygen flow such that the voltage would remain high and not crash the target voltage. The system was operated at 16 kW of power to deposit a 25 nm thick layer of silicon aluminum oxide onto the cured organic layer.

A further in-line process was used to create a second polymeric layer on top of the silicon aluminum oxide layer, also in the same pass through the vacuum coater. This polymeric layer was produced by atomization and evaporation of a monomer mixture containing SARTOMER SR833S (94 weight percent (wt %)) and Dynasylan 1189 (6 wt %) (available from Evonik Industries (Essen, Germany). The flow rate of this mixture into the atomizer was 0.67 ml/min to achieve a 375 nm layer, the gas flow rate was 60 sccm, and the evaporator temperature was 260° C. Once condensed onto the inorganic layer, the coated acrylate monomer mixture was cured with an electron beam operating at 7 kV and 10 mA.

This completed Example 1 film was tested within two weeks of manufacture using the T-peel measurement according to the test method described above. The average peel off force in units of g/in was measured to be 3.9, with a peak peel off force of 4.9.

Example 2

Barrier Coating on SiAl for Release

A barrier coating on metal construction was prepared as in Example 1, except in place of the Cu layer deposition, SiAl was deposited at a line speed of 32 fpm (9.8 m/min).

The cathode had a Si(90%)/Al(10%) target obtained from Soleras Advanced Coatings US, of Biddeford, (Me.). A conventional AC sputtering process employing Ar gas and operated at 16 kW of power was used to deposit a 7 nm thick layer of SiAl alloy onto the substrate.

The completed Example 2 film was tested within two weeks of manufacture using the T-peel measurement according to the test method described above. The peel off force in units of g/in was measured to be 2.0, with a peak peel off force of 3.0.

The water vapor transmission rate of the Example 2 film was measured according to the test method discussed above. The water vapor transmission rate in this experiment was found to be less than 0.005 g/m$^2$/day.

Example 3

Barrier Coating on Nb for Release

A barrier coating on metal construction was prepared as in Example 1, except in place of the Cu layer deposition, Nb was deposited at a line speed of 20 fpm (6.1 m/min).

A cathode Nb target (obtained from ACI Alloys of San Jose, Calif.) was used in a conventional DC sputtering process employing Ar gas and operated at 2 kW of power to deposit a 7 nm thick layer of Nb onto the substrate.

The completed Example 3 film was tested within two weeks of manufacture using the T-peel measurement according to the test method described above. The peel off force in units of g/in was measured to be 3.7 with a peak value of 178 g/in.

Example 4

Barrier Coating on Ti for Release

A barrier coating on metal construction was prepared as in Example 1, except in place of the Cu layer deposition, Ti was deposited at a line speed of 12 fpm (3.7 m/min).

A cathode Ti target obtained from ACI Alloys of San Jose, Calif. was used in a conventional DC sputtering process employing Ar gas and operated at 2 kW of power to deposit a 7 nm thick layer of Ti onto the substrate.

The completed Example 4 film was tested within two weeks after vapor deposition using the T-peel measurement according to the test method described above. The peel off force in units of g/in was measured to be 4.5 with a peak value of 566 g/in.

Example 5

Barrier Coating on NiCr for Release

A barrier coating on metal construction was prepared as in Example 1, except in place of the Cu layer deposition, NiCr was deposited at a line speed of 20 fpm (6.1 m/min).

A cathode NiCr target obtained from ACI Alloys of San Jose, Calif. was used in a conventional DC sputtering process employing Ar gas and operated at 2 kW of power to deposit a 7 nm thick layer of NiCr onto the substrate.

The completed Example 5 film was tested within two weeks after vapor deposition using the T-peel measurement according to the test method described above. The peel off force in units of g/in was measured to be 3.4 with a peak of 4.5 g/in.

Example 6

Barrier Coating on Zr for Release

A barrier coating on metal construction was prepared as in Example 1, except in place of the Cu layer deposition, Zr was deposited at a line speed of 14 fpm (4.3 m/min).

A cathode Zr target was used in a conventional DC sputtering process employing Ar gas and operated at 2 kW of power to deposit a 7 nm thick layer of Zr onto the substrate.

The completed Example 6 film was tested within two weeks of manufacture using the T-peel measurement according to the test method described above. The peel off force in units of g/in was measured to be 9.1 with a peak of 174 g/in.

Example 7

Barrier Coating on Al for Release

A barrier coating on metal construction was prepared as in Example 1, except in place of the Cu layer deposition, Al was deposited at a line speed of 9.5 fpm (2.9 m/min).

A cathode Al target obtained from ACI Alloys of San Jose, Calif. was used in a conventional DC sputtering process employing Ar gas and operated at 2 kW of power to deposit a 7 nm thick layer of Al onto the substrate.

The completed Example 7 film was tested within two weeks of manufacture using the T-peel measurement according to the test method described above. The peel off force in units of g/in was measured to be 6.8 with a peak of 350 g/in.

Example 8

Barrier Coating on Doped Semiconductor B-Doped Si for Release

A construction comprising a barrier coating on a B-doped Si was prepared as in Example 1, except in place of the Cu layer deposition, SiB was deposited at a line speed of 7 fpm (2.1 m/min).

A cathode SiB target obtained from Soleras Advanced Coatings US, of Biddeford, (Me.) was used in a conventional DC sputtering process employing Ar gas and operated at 2 kW of power to deposit a 7 nm thick layer of SiB onto the substrate.

The completed Example 8 film was tested within two weeks after vapor deposition using the T-peel measurement according to the test method discussed above. The peel off force in units of g/in. was measured to be 6.5 with a peak peel force of 7.8.

Example 9

Barrier Coating on SiAlOx for Release

A barrier coating on oxide construction was prepared as in Example 1, except in place of the Cu layer deposition, silicon aluminum oxide [SiAlOx] was deposited at a line speed of 7 fpm (2.1 m/min).

The SiAlOx was laid down by an AC reactive sputter deposition process employing a 40 kHz AC power supply. The cathode had a Si(90%)/Al(10%) rotary target obtained from Soleras Advanced Coatings US, of Biddeford, (Me.). The voltage for the cathode during sputtering was controlled by a feed-back control loop that monitored the voltage and controlled the oxygen flow such that the voltage would remain high and not crash the target voltage. The system was operated at 16 kW of power to deposit a 20 nm thick layer of silicon aluminum oxide.

The completed Example 9 film was tested within two weeks of manufacture using the T-peel measurement according to the test method described above. The peel off force in units of g/in was measured to be 8 g/in with a peak peel force of 400 g/in.

Comparative Example 1

Barrier Coating on PET for Release

A barrier coating on a PET substrate construction was prepared as in Example 1, except no metal was deposited.

The completed Comparative Example 1 film was tested within two weeks of manufacture using the T-peel measurement according to the test method described above. The peel off force in units of g/in was measured to be above 800 g/in.

Example 10

NbOx Optical Coating for Release

The film of Example 10 was made on a roll to roll vacuum coater similar to the coater described in U.S. Pat. No. 5,440,446 (Shaw, et al.) and U.S. Pat. No. 7,018,713 (Padiyath, et al.). This coater was outfitted with a substrate in the form of 0.05 mm thick, 14 inch (35.6 cm) wide polyethylene terephthalate (PET) film 1000 feet in length manufactured by 3M Company. The substrate was prepared for coating by subjecting it to a nitrogen plasma treatment to improve the adhesion of the metallic layer.

On this prepared PET substrate, a SiAl layer was deposited at a line speed of 32 fpm (9.8 m/min). The cathode had a Si(90%)/Al(10%) target obtained from Soleras Advanced Coatings US, of Biddeford, Me. A conventional AC sputtering process employing Ar gas and operated at 16 kW of power was employed to deposit a 12 nm thick layer of SiAl alloy onto the prepared substrate.

On top of the SiAl, a layer of tricyclodecane dimethanol diacrylate monomer was applied by ultrasonic atomization and flash evaporation of the monomer to make a coating width of 12.5 inches (31.8 cm). The flow rate of the monomer into the atomizer was 1.33 ml/min to achieve a 375 nm layer, the gas flow rate was 60 sccm, and the evaporator temperature was 260° C. Once condensed onto the SiAl layer, this acrylate monomer coating was cured immediately with an electron beam curing gun operating at 7.0 kV and 4.0 mA.

The film was then rewound and a second pass was used to deposit a function layer on the cured organic acrylate layer. The cathode had a ceramic suboxide NbOx target obtained from Soleras Advanced Coatings US, of Biddeford, (Me.) was used in a conventional DC sputtering process operated at 2 kW of power to deposit an approximately 66 nm thick layer of NbOx onto the cured organic acrylate layer to form a quarter wave optical thickness optical function layer at a line speed of 1 fpm (0.3 m/min).

The completed Example 10 film was tested within two weeks of manufacture using the 180° peel test according to the test method described above. The peel off force in units of g/in was measured to be 12 with a peak value of 15.

Example 11

Transparent Conductor Coating for Release

The film of Example 11 was made on a roll to roll vacuum coater similar to the coater described in U.S. Pat. No. 5,440,446 (Shaw et al.) and U.S. Pat. No. 7,018,713 (Padiyath, et al.). This coater was outfitted with a substrate in the form of a roll of 0.05 mm thick, 14 inch (35.6 cm) wide PET film 1000 feet in length, manufactured by 3M Company. The substrate was prepared for coating by subjecting it to a nitrogen plasma treatment to improve the adhesion of the metal layer.

On top of this PET substrate, a metal layer was deposited at a line speed of 16 fpm (4.9 m/min), using a cathode that had a Si(90%)/Al(10%) target (obtained from Soleras Advanced Coatings US, of Biddeford, Me.) in a conventional AC sputtering process employing Ar gas and operated at 12 kW of power to deposit a 19 nm thick layer of SiAl alloy onto the substrate.

On top of the SiAl, an organic acrylate layer was formed on the substrate by applying tricyclodecane dimethanol diacrylate using ultrasonic atomization and flash evaporation to make a coating width of 12.5 inches (31.8 cm). The flow rate of this monomer into the atomizer was 0.67 ml/min to achieve a 375 nm layer, the gas flow rate was 60 sccm, and the evaporator temperature was 260° C. Once condensed onto the SiAl layer, this acrylate monomer coating was immediately cured with an electron beam curing gun operating at 7.0 kV and 4.0 mA.

The film was then rewound and a second pass was used to deposit a transparent conductor functional layer on the organic acrylate layer. The cathode (ceramic ITO (indium oxide 93 wt %:tin oxide 7 wt %) target, obtained from Umicore Thin Film Products (Providence, R.I.)) was used in a conventional DC sputtering process operated at 2 kW of power with an Ar flow of 450 sccm and an oxygen flow of 12 sccm to deposit an approximately 75 nm thick layer of ITO onto the substrate from the cathode at a line speed of 4.6 fpm (1.4 m/min).

The film of Example 11 was tested within two weeks of manufacture using the 180° peel test measurement according to the test method described above. The peel off force in units of g/in. was measured to be 8 with a peak value of 15.

Example 12

Optical Color Shift Coating for Release

The coated film of Example 12 was made on a roll to roll vacuum coater similar to the coater described in U.S. Pat. No. 5,440,446 (Shaw et al.) and U.S. Pat. No. 7,018,713 (Padiyath, et al.). This coater was outfitted with a substrate in the form of a roll of 0.05 mm thick, 14 inch (35.6 cm) wide PET film 1000 feet in length, manufactured by 3M Company. The substrate was prepared for coating by subjecting it to a nitrogen plasma treatment to improve the adhesion of the metal containing layer.

A metal layer was deposited on this PET substrate at a line speed of 32 fpm (9.8 m/min). The cathode had a Si(90%)/Al(10%) target (obtained from Soleras Advanced Coatings US, of Biddeford, Me.) and a conventional AC sputtering process employing Ar gas and operated at 24 kW of power was used to deposit a 19 nm thick layer of SiAl alloy onto the substrate.

On this SiAl layer, an organic acrylate layer was deposited by applying tricyclodecane dimethanol diacrylate monomer using ultrasonic atomization and flash evaporation to make a coating width of 12.5 inches (31.8 cm). The flow rate of this monomer into the atomizer was 1.33 ml/min to achieve a 375 nm layer, the gas flow rate was 60 sccm, and the evaporator temperature was 260° C. Once condensed onto the SiAl layer, this monomer coating was cured immediately with an electron beam curing gun operating at 7.0 kV and 10.0 mA.

The film was rewound. In a second forward pass through the vacuum coater, a semi-transparent layer of Ge was deposited as the first layer of a multilayer functional stack on top of the cured monomer layer. The cathode Ge target was used in a conventional DC sputtering process operated at 1.5 kW of power to deposit an approximately 9 nm thick layer of Ge onto the cured monomer layer at a line speed of 16 fpm (4.9 m/min).

The film was rewound and in a third forward pass through the vacuum coater, the second layer in the functional stack was formed by depositing a tricyclodecane dimethanol diacrylate monomer layer on the Ge layer at a line speed of 14.5 fpm (4.4 m/min). This monomer layer was formed on the substrate by applying the monomer using ultrasonic atomization and flash evaporation to make a coating width of 12.5 inches (31.8 cm). The flow rate of the monomer into the atomizer was 0.8 ml/min to achieve a 410 nm layer, the gas flow rate was 60 sccm, and the evaporator temperature was 260° C. Once condensed onto the Ge layer, the monomer coating was cured immediately with an electron beam curing gun operating at 7.0 kV and 7.0 mA.

The film was again rewound. In a fourth forward pass, an opaque layer of Al was deposited as the last layer of the multilayer functional stack. The Al was deposited onto the cured monomer layer deposited during the previous forward pass. The cathode Al target (obtained from ACI Alloys of Palo Alto, Calif.) was used in a conventional DC sputtering process operated at 4 kW of power using two cathodes to deposit an approximately 60 nm thick layer of Al onto the cured monomer layer at a line speed of 25 fpm (7.7 m/min).

The film of Example 12 was tested within two weeks of manufacture using the 180° peel test measurement according to the test method described above. The peel off force in units of gun was measured to be 3 with a peak value of 5.

All references and publications cited herein are expressly incorporated herein by reference in their entirety into this disclosure. Illustrative embodiments of this invention are discussed and reference has been made to possible variations within the scope of this invention. For example, features depicted in connection with one illustrative embodiment may be used in connection with other embodiments of the invention. These and other variations and modifications in the invention will be apparent to those skilled in the art without departing from the scope of the invention, and it should be understood that this invention is not limited to the illustrative embodiments set forth herein. Accordingly, the invention is to be limited only by the claims provided below and equivalents thereof.

What is claimed is:

1. A transfer article comprising:
   a release layer, wherein the release layer comprises a metal layer or a doped semiconductor layer;
   a first acrylate layer overlaying the release layer, the first acrylate layer obtained from an electron beam cured condensed acrylate; and
   a function layer overlaying the first acrylate layer;
   wherein a release value between the release layer and the first acrylate layer is from 2 to 12 g/inch.

2. The transfer article of claim 1, further comprising a substrate underlaying the release layer.

3. The transfer article of claim 1, further comprising an adhesive layer.

4. The transfer article of claim 1, wherein a thickness of the function layer is less than 5 μm.

5. The transfer article of claim 1, wherein the function layer comprises a barrier layer.

6. The transfer article of claim 5, wherein the barrier layer has a water vapor transmission rate of less than 0.1 $g/m^2/day$.

7. The transfer article of claim 5, wherein the barrier layer has a water vapor transmission rate of less than 0.005 $g/m^2/day$.

8. The transfer article of claim 5, wherein the barrier layer comprises at least one selected from the group consisting of individual metals, two or more metals as mixtures, intermetallics or alloys, semi-metal or metalloids, metal oxides, metal and mixed metal oxides, metal and mixed metal fluorides, metal and mixed metal nitrides, metal and mixed metal carbides, metal and mixed metal carbonitrides, metal and mixed metal oxynitrides, metal and mixed metal borides, metal and mixed metal oxy borides, metal and mixed metal silicides, diamond-like carbon, diamond-like glass, graphene, and combinations thereof.

9. The transfer article of claim 1, wherein the function layer comprises an optical layer.

10. The transfer article of claim 1, wherein the function layer comprises an electrically conductive layer.

11. The transfer article of claim 1, further comprising a second acrylate layer.

12. A method comprising:
   applying the transfer article of claim 1 to a surface of interest, with the function layer being between the release layer and the surface of interest; and
   removing the release layer from the transfer article with the first acrylate layer and the function layer left on the surface of interest.

13. The transfer article of claim 1, wherein the release value between the release layer and the first acrylate layer is from 2 to 10 g/inch.

* * * * *